US007421049B2

(12) United States Patent
Fernald et al.

(10) Patent No.: US 7,421,049 B2

(45) Date of Patent: Sep. 2, 2008

(54) APPARATUS AND METHOD FOR AUTOMATED DETERMINATION OF SAMPLING PHASE OF AN ANALOG VIDEO SIGNAL

(75) Inventors: Michael Joseph Fernald, Kernersville, NC (US); Tyre Paul Lanier, Kernersville, NC (US)

(73) Assignee: Analog Devices, Inc., Norwood, MA (US)

( * ) Notice: Subject to any disclaimer, the term of this patent is extended or adjusted under 35 U.S.C. 154(b) by 694 days.

(21) Appl. No.: 10/834,527

(22) Filed: Apr. 29, 2004

(65) Prior Publication Data

US 2005/0243956 A1 Nov. 3, 2005

(51) Int. Cl.
*H04L 7/00* (2006.01)

(52) U.S. Cl. ........................................ 375/355

(58) Field of Classification Search .................. 375/355
See application file for complete search history.

(56) References Cited

U.S. PATENT DOCUMENTS 4,881,121 A 11/1989 Judge
5,767,916 A 6/1998 West
5,805,233 A 9/1998 West
5,990,968 A 11/1999 Naka et al.
6,097,444 A 8/2000 Nakano
6,633,288 B2 10/2003 Agarwal et al.
7,113,560 B1 * 9/2006 Huang et al. ................ 375/355

FOREIGN PATENT DOCUMENTS

EP 0749236 A2 12/1996

OTHER PUBLICATIONS

International Search Report PCT/US2005/015300, dated Aug. 22, 2005.
English translation of communication from the State Intellectual Property Office of People's Republic of China, dated Dec. 7, 2007 for Chinese Patent Application No. 200580013365.7.

* cited by examiner

*Primary Examiner*—Kevin Kim
(74) *Attorney, Agent, or Firm*—Wolf Greenfield & Sacks P.C.

(57) ABSTRACT

A method and an apparatus provide extraction of data from an analog signal. The method includes deriving a data-location signal having amplitude transitions that identify a phase of amplitude transitions of the analog signal, and, in response to the data-location signal, selecting a sampling clock signal having a phase different from the phase of the amplitude transitions of the analog signal. The apparatus includes a signal generator that derives from the analog signal a data-location signal, and a selector that selects a sampling clock signal having a phase different from the phase of the amplitude transitions of the analog signal.

23 Claims, 6 Drawing Sheets

APPARATUS AND METHOD FOR AUTOMATED DETERMINATION OF SAMPLING PHASE OF AN ANALOG VIDEO SIGNAL

BACKGROUND OF INVENTION

1. Field of Invention

The invention relates to extraction of data encoded in an analog signal, and, more particularly, to apparatus and methods for phase selection of a sampling clock signal utilized to extract data from an analog signal.

2. Discussion of Related Art

Cathode-ray tube (CRT) displays utilize an analog signal having an amplitude that controls the intensity of an electron beam forming an image in the display. Since digital data processing devices, such as a personal computers, have commonly utilized CRT displays, the devices typically convert digital image data into an analog video signal that can drive a CRT display. A personal computer, for example, typically converts digital pixel data into an analog signal whose amplitude corresponds to pixel intensity levels; the analog video signal can drive a CRT display in a conventional way.

In contrast to CRT displays, flat-panel displays, such as liquid-crystal displays (LCDs), utilize digital pixel data to drive the display image. Thus, when a flat-panel display receives an analog video signal from a personal computer, it converts the analog video signal into a digital data signal by extracting the pixel data encoded in the analog video signal. The digital data signal in turn can be used to drive the display's image. To accomplish this, the analog video signal is sampled and converted to digital data by an analog-to-digital converting circuit. Such circuits utilize sampling clocks having a frequency and phase selected to appropriately sample the analog video signal.

The phase of a sampling clock signal should be selected to provide sampling of the analog video signal within intervals that correspond to pixel data. If the analog video signal is sampled too close to the boundaries between intervals, errors in data extraction can occur. These errors can lead to fuzzy images.

The phase can be selected in response to the synchronizing signals embedded in the analog video signal. Phase errors can arise, however, from signal delays and other factors. Therefore, a sampling clock phase typically requires manual or automated adjustment. Some displays include hardware and related software to implement algorithms to extract phase information from the digital data signal produced by the analog-to-digital conversion process. Such phase determination approaches can be, for example, cumbersome, error prone, and subject to time-related phase drift.

SUMMARY OF INVENTION

The invention relates, in part, to extraction of data from an analog signal whose magnitude variations are associated with pixel-related data. The invention arises, in part, from the realization that the pixel-related transitions of the analog signal may be employed to select the phase of a sampling clock signal, without first converting the analog signal to a digital data signal. Methods and apparatus according to principles of the invention, can provide low-cost, accurate, continuous, and quick selection of an appropriate sampling clock signal for decoding of data encoded in an analog signal.

Accordingly, in one aspect, the invention features a method for extracting data from an analog signal, such as an analog video signal that has an amplitude modulated in association with pixel data. The method includes deriving a data-location signal, and selecting, in response to the data-location signal, a sampling clock signal. The data-location signal has amplitude transitions that identify a phase of amplitude transitions of the analog signal. The sampling clock signal has a phase that is different from the phase of the amplitude transitions of the analog signal.

The data-location signal can identify the phase of the analog-signal transitions by having a known phase relationship with the analog-signal transitions. The data-location signal can be in-phase or out-of-phase with the analog-signal transitions.

The data-location signal can be obtained by generating a chain of pulses associated with the amplitude transitions of the analog signal. The pulses can have rising edges associated with the amplitude transitions of the analog signal. The data-location signal can be derived in part by filtering a direct-current (DC) component from the analog signal, and the chain of pulses can be generated by generating a pulse for each amplitude spike of the filtered analog signal that exceeds a threshold level.

The sampling clock signal can be selected by selecting one of a plurality of sampling clock signals that is out-of-phase with the data-location signal. The plurality of sampling clock signals can be generated by providing a plurality of clock signals having a plurality of phases distributed across one interval of the amplitude transitions of the analog signal. The sampling clock signal can be selected by comparing at least one of the plurality of sampling clock signals with the data-location signal to select one of the plurality of sampling clock signals that satisfies a predetermined phase condition. The sampling clock signal can be selected by offsetting the sampling clock signal relative to the data-location signal by a phase amount that is one of a fixed phase offset and a programmable phase offset.

The method can include sampling, responsive to the sampling clock signal, the amplitude of the analog signal at intervals between the transitions of the analog signal. Sampling can include supplying the sampling clock signal to an analog-to-digital converter (ADC) that receives the analog signal.

In another aspect, the invention features an apparatus for extracting data from an analog signal. The apparatus includes a signal generator that derives from the analog signal a data-location signal having amplitude transitions that identify a phase of amplitude transitions of the analog signal, and a selector that selects, in response to the data-location signal, a sampling clock signal having a phase different from the phase of the amplitude transitions of the analog signal.

The signal generator can include a pulse generator that generates a chain of pulses associated with the amplitude transitions of the analog signal. The signal generator can further include a filter that filters a DC component from the analog signal, and the pulse generator generates a pulse for each amplitude spike of the filtered analog signal that exceeds a threshold level.

The apparatus can include a sampling clock signal generator that generates a plurality of sampling clock signals that are distributed in phase, and have a frequency substantially the same as a frequency of the amplitude transitions of the analog signal. The selector can include a signal comparator that compares signals of the plurality of sampling clock signals with the data-location signal.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2*a* is a graph of an example of an analog signal, according to principles of the invention;

FIG. 2*b* is a graph of an example of a data-location signal derived from the analog signal of FIG. 2*a;*

FIG. 2*c* is a graph of an example of a sampling clock signal selected in response to the data-location signal of FIG. 2*b;*

DETAILED DESCRIPTION

Figure 1:
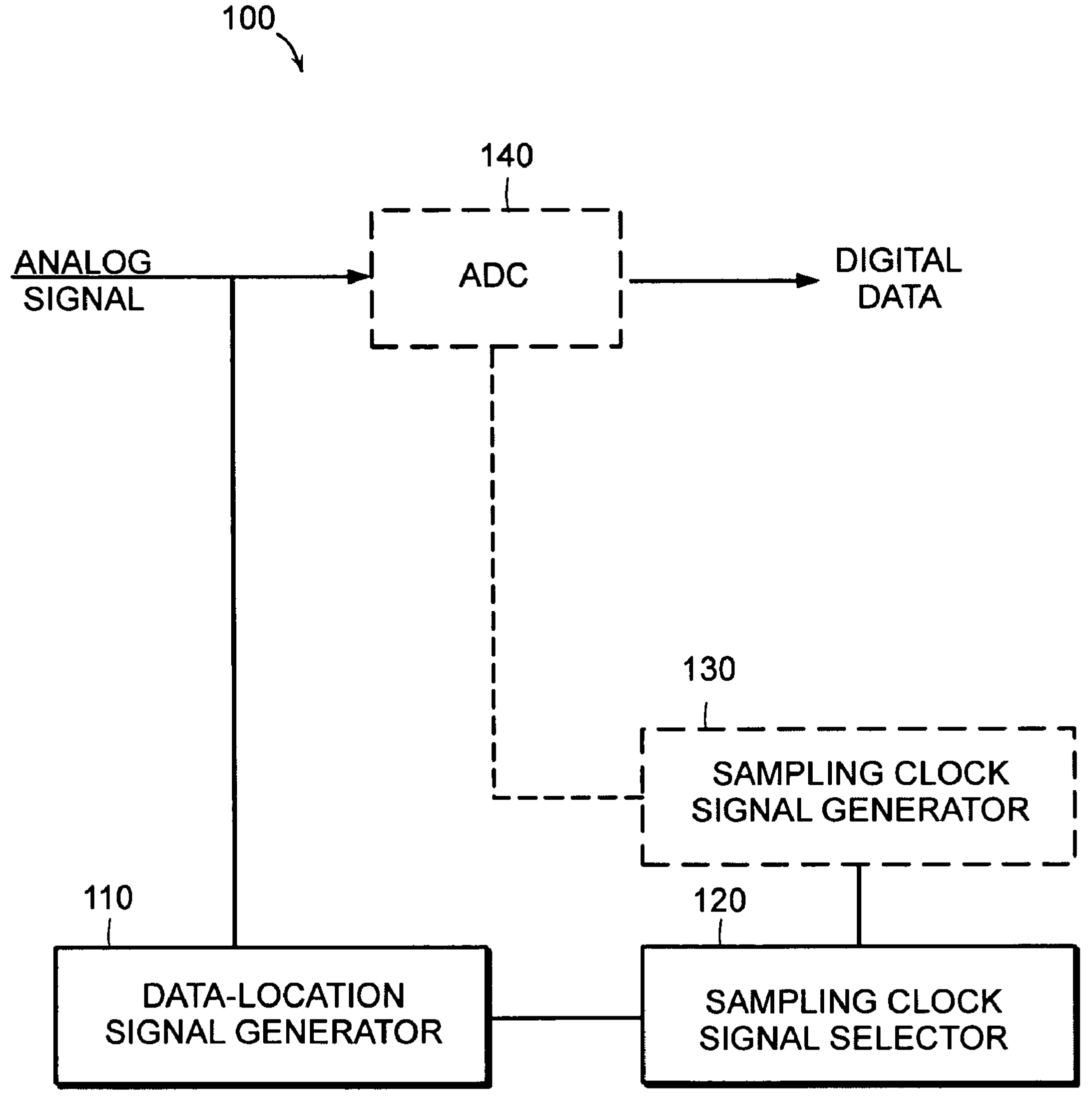
FIG. 1 is a block diagram of an embodiment of an apparatus for extracting data from an analog signal, according to principles of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The present invention will now be described by way of a specific, non-limiting, example. It should be understood that the invention applies to systems and circuits beyond those discussed here. Specific values of frequencies and other circuit parameters are meant for illustrative purposes only, and are non-limiting.

FIG. 1 is a block diagram of an apparatus 100 for extracting data from an analog signal. The analog signal can be, for example, an analog video signal produced by a digital processing device for use by a CRT and/or LCD display. The apparatus 100 includes a data-location signal generator 110 that receives the analog signal, and a sampling clock signal selector 120 in electrical communication with the data-location signal generator 110. The apparatus 100 may also include a sampling clock signal generator 130 in electrical communication with the sampling clock signal selector 120, and an analog-to-digital converter (ADC) in electrical communication with the sampling clock signal generator 130.

As described in more detail below, with reference to FIG. 2*a*, the analog signal can have, for example, an amplitude encoded with video-pixel intensity information. The amplitude can vary, for example, in proportion to corresponding pixel image intensity. Such an analog signal has sequential intervals, each interval's amplitude identifying an associated pixel's intensity level. If two neighboring intervals have different amplitudes, i.e., are associated with different pixel intensity levels, the two intervals will be separated by an amplitude transition of the analog signal. Thus, amplitude transitions of the analog signal identify the location of data encoded in the analog signal. That is, amplitude transitions mark a boundary between neighboring intervals. Moreover, according to principles of the invention, the data-location signal generator 110 derives the data-location signal from the analog signal before the analog signal is subjected to analog-to-digital processing.

The sampling clock signal selector 120, in response to the signal received from the data-location signal generator 110, can select a sampling clock signal that is appropriate for sampling of the analog signal. For example, the apparatus 100 can include an analog-to-digital converter (ADC), and the sampling clock signal generator 130 can include a dynamic-lock-loop (DLL) that produces a plurality of sampling signals distributed in phase relative to one another. The sampling clock signal selector 120 then acts to select an appropriate one of the plurality of sampling signals. The selected sampling clock signal can then be provided to the ADC to cause the ADC to sample the analog signal at preferred temporal positions of the amplitude intervals, for example, at or near the midpoints of the intervals.

As will be understood by one having ordinary skill in the signal processing arts, conventional video processing systems often utilize the digitized data signal produced by an ADC to determine an appropriate phase for the clock signal provided to the ADC. Alternatively, some conventional systems rely on a manual adjustment of a clock signal provided to an ADC to obtain a desired image quality.

The sampling clock signal can by selected to be, for example, a half-cycle out-of-phase with the amplitude transitions of the analog signal. If the data-location signal is in-phase with the amplitude transitions of the analog signal, the sampling clock signal can then be selected to be a half-cycle out-of-phase with the data-location signal by, for example, comparison to the data-location signal.

The sampling clock signal selector 120 can be configured to compare sampling clock signals of varying phase with the data-location signal to select a sampling clock signal having an appropriate phase. The sampling clock signal selector 120 can include a feedback circuit to support the selection process.

Figure 2A:
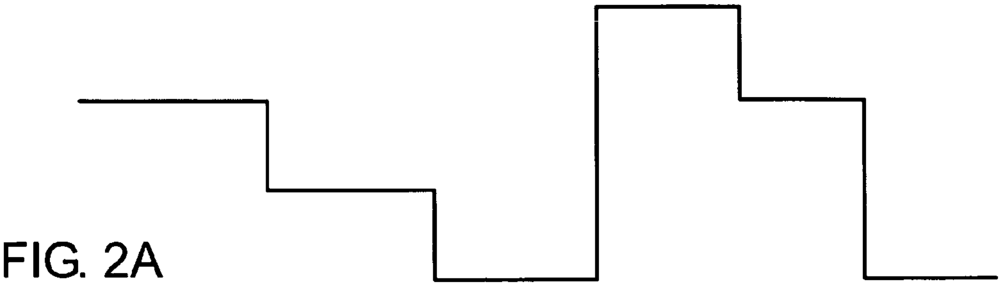
FIGS. 2*a*, 2*b*, and 2*c* are graphs of illustrative examples of an analog signal.
Figure 2B:
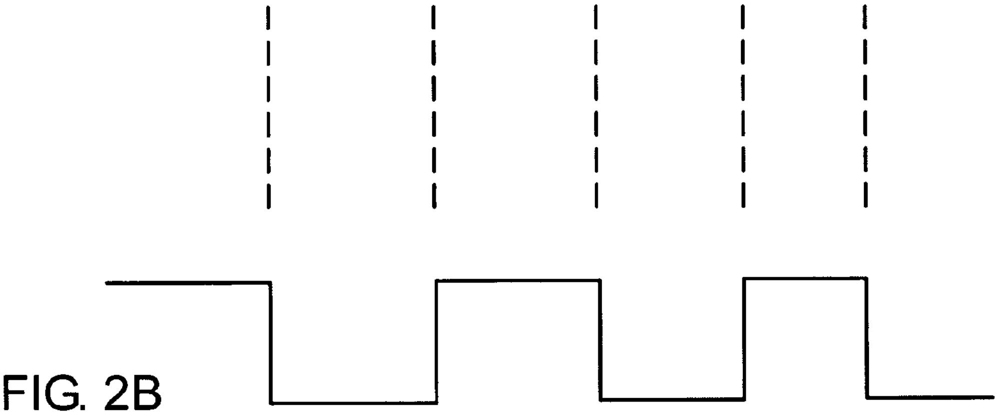
Figure 2C:
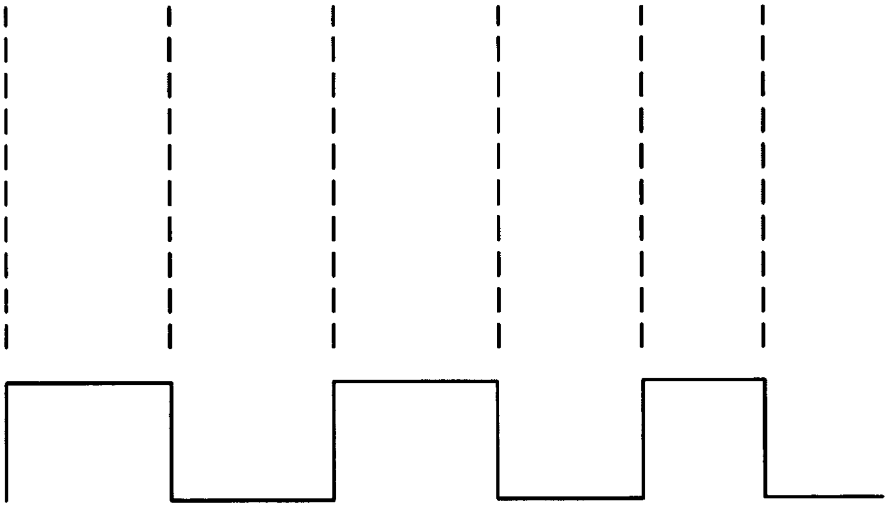

FIGS. 2*a*, 2*b*, and 2*c* are graphs of illustrative examples of an analog signal (FIG. 2*a*), a data-location signal derived from the analog signal (FIG. 2*b*), and a sampling clock signal selected in response to the data-location signal (FIG. 2*c*). The analog signal has an amplitude that changes from interval-to-interval in correspondence with changes in encoded data from interval-to-interval.

The data location signal (FIG. 2*b*), in this example, has two amplitude levels; transitions from low-to-high level and high-to-low level are associated with the amplitude transitions of the analog signal. In this example, the data-location signal is substantially in-phase with the amplitude transitions of the analog signal. That is, the process of deriving the data-location signal from the analog signal has incurred insubstantial phase delays.

The sampling clock signal (FIG. 2*c*) selected in response to the data-location signal is out-of-phase with the transitions of the analog signal. The transitions of the sampling clock signal thus identify appropriate points in time to sample the analog signal to avoid sampling the analog signal too near to a transition of the analog signal.

The analog signal can be, for example, a monochrome video signal having horizontal-synchronization and vertical-synchronization components to identify frames and scan lines within frames, as would be understood by one having ordinary skill in the video display arts. More generally, an analog signal can include three color signals.

The data-location signal generator 110 derives a data-location signal from the analog signal. The data-location signal identifies the phase location of the encoded intervals of the analog signal. The data-location signal can have amplitude transitions that are in-phase, or substantially in-phase, with the amplitude transitions of the analog signal. Alternatively, the data-location signal can have a known phase relationship relative to the analog signal.

Figure 3:
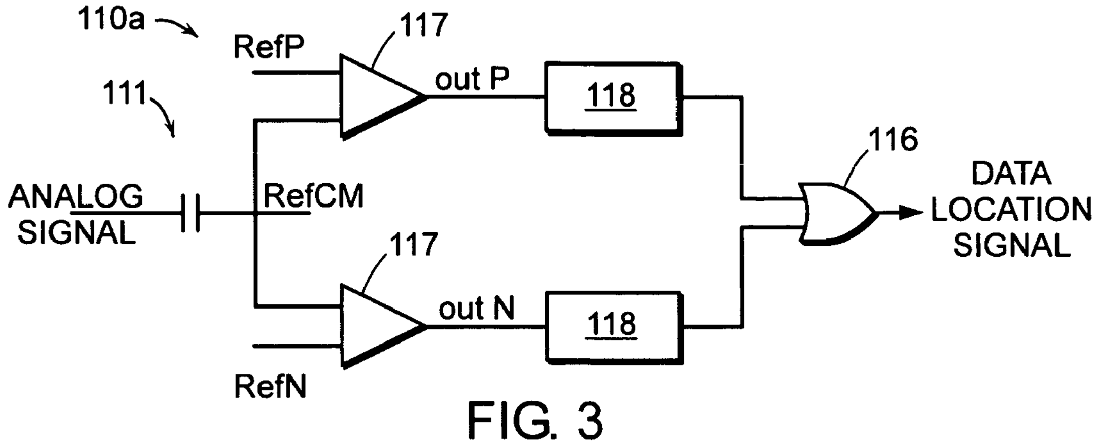
FIG. 3 is a schematic diagram of one embodiment of a data-location signal generator, according to principles of the invention.

FIG. 3 is a schematic diagram of one embodiment of a data-location signal generator 110*a* that can serve as the generator 110 illustrated in FIG. 1, according to principles of the invention. The data-location signal generator 110*a* includes a filter 111 that receives the analog signal, comparators 117 that receive both the filtered analog signal and reference signals RefCM, RefP, RefN, pulse generators 118 that receive the output signals OutP, OutN from the comparators 117, and a pulse-combining circuit 116, such as an OR-gate, that receives the output pulses from the pulse generators 118.

The filter 111, which can include a capacitor (as depicted), strips a DC component from the analog signal. A common reference signal RefCM, having a common voltage level, can be added to the stripped analog signal so that amplitude transitions in the original analog signal will appear as spikes above or below the level of the reference signal RefCM (see FIG. 4, described below.) The two comparators 117, which can be amplifiers (as depicted), receive the stripped analog signal exhibiting spikes relative to the reference level RefCM.

The comparators 117 can discriminate spikes in the stripped signal that correspond to amplitude transitions of the analog signal. The discrimination can serve, for example, to remove noise in the stripped signal. To accomplish this discrimination, one of the comparators 117 receives a high-reference signal RefP while the other comparator 117 receives a low-reference signal RefN. Each of the comparators 117 then produces an output pulse for each spike that exceeds the level of the received reference signal RefP, RefN. Thus, the comparators 117 produce output signals OutP, OutN that have pulses corresponding to verified spikes in the stripped analog signal.

Figure 4:
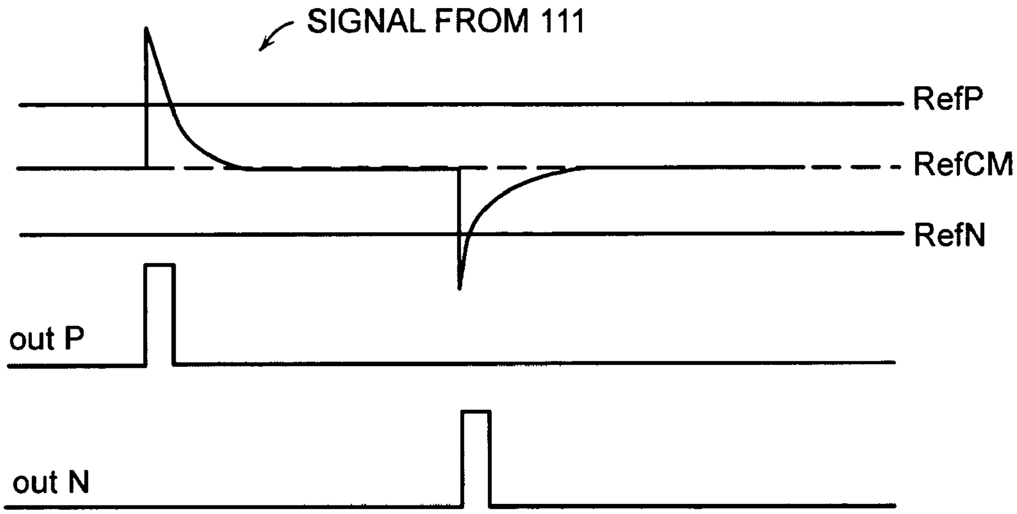
FIG. 4 is a graph of an example of a stripped analog signal, a common reference level, and comparator output signals, according to principles of the invention.

FIG. 4 is a graph that provides an illustrative example of the stripped analog signal, having a common reference level RefCM, as provided to the comparators 117, and the comparator output signals OutP, OutN. As illustrated, where spikes in the stripped signal exceed the reference levels RefP, RefN, the corresponding comparator 117 produces a pulse in its output signal OutP, OutN.

The output signals OutP, OutN can then be delivered to pulse generators 118 to convert the received pulses into, for example, pulses of a desired width and/or amplitude. The signals from the pulse generators 118 are then combined by the Or-gate 116 to produce a completed data-location signal.

As determined by the selection of components, such as the pulse generators 118, the data-location signal may appear similar to a conventional encode clock signal. For example, the data-location signal can have a pulse width, height, and frequency similar to that of an encode clock signal provided to an ADC in a conventional system. Typically, however, the data-location signal while have some missing pulses, i.e., gaps in the chain of pulses. The gaps are associated with two or more intervals of the analog signal during which the amplitude remains unchanged. The boundaries of such intervals do not exhibit an amplitude transition to induce a corresponding pulse to appear in the data-location signal. It will be apparent to one having ordinary skill in the signal processing arts that further manipulation of the data-location signal can fill all gaps in the signal. Such additional manipulation, however, is unnecessary for effective functioning of the apparatus 100.

The data-location signal can have a phase delay relative to the amplitude transitions of the analog signal. The delay can be unintentional, arising from the inherent actions of components of the apparatus 100. The delay can be intentional, in response to selection of components included, for example, in the data-location signal generator 110, 110*a*. It will be understood by one having ordinary skill in the signal processing arts that a data-location signal, according to principles of the invention, provides a reference signal having a known phase for selection of a sampling signal to support sampling of the data encoded in the analog signal.

The circuit illustrated in FIG. 3 is intended to be illustrative and not limiting. It will be apparent to one having skill in the signal processing arts that many variations on the illustrated circuit can serve as the data-location signal generator 110, consistent with principles of the invention. Such circuits can generate a pulse chain or other signal that can serve as the data-location signal.

Figure 5:
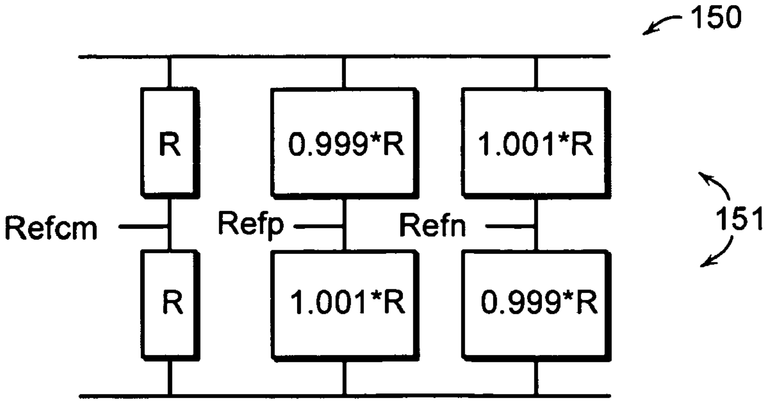
FIG. 5 is a schematic diagram of an embodiment of a reference signal generator, according to principles of the invention.

FIG. 5 is a schematic diagram of an embodiment of a reference signal generator 150, which can produce the three reference signals RefCM, RefP, RefN. The reference signal generator 150 includes three pairs of resistors 151 connected in parallel. A voltage is placed across the pairs of resistors 151. The resistance values of the resistors are selected, as illustrated, to provide a high-reference level RefP that is a desired amount above the common reference level RefCM, and to provide a low-reference level RefN that is a desired amount below the common reference level RefCM. The precise values of the resistors 151 can be chosen to give a desired level of discrimination. The three reference signals RefCM, RefP, RefN can be, for example, 1.0V, 1.2V and 0.8V.

Figure 6:
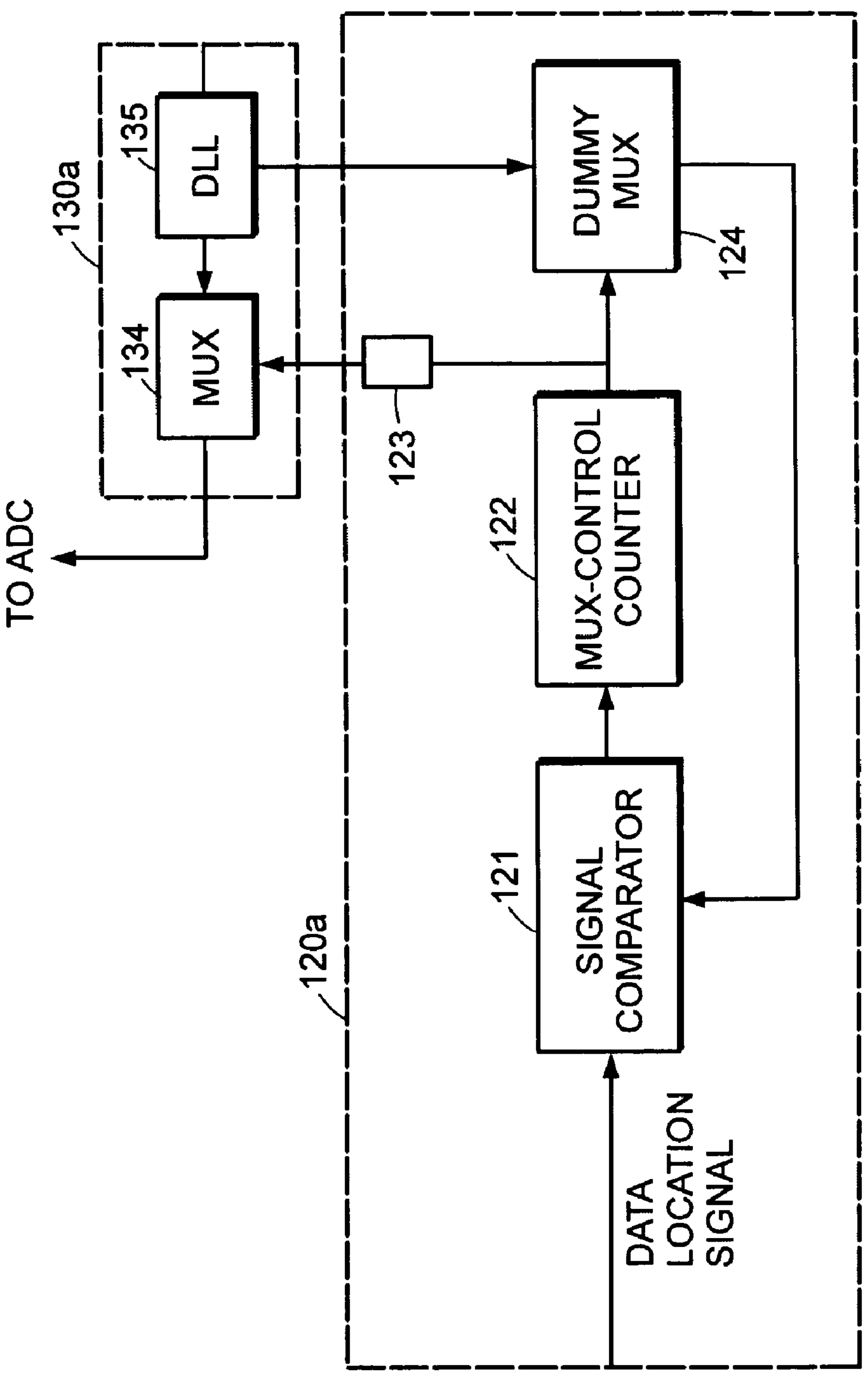
FIG. 6 is a schematic diagram of embodiments of a sampling clock signal selector and a sampling clock-signal generator, according to principles of the invention.

FIG. 6 is a schematic diagram of an embodiment of a sampling clock signal selector 120*a* and an embodiment of a sampling clock-signal generator 130*a*, which, according to principles of the invention, can serve respectively as the sampling clock signal selector 120 and the sampling clock signal generator 130 of the apparatus 100 described above. The sampling clock-signal selector 130*a* includes a multiplexer (MUX) 134 and a delay-lock loop (DLL) 135. The sampling clock-signal selector 120*a* includes a signal comparator 121, a counter 122, a dummy MUX 124, and a filter 123.

The DLL 135 provides sampling clock signals for use by the ADC 140. The MUX 134 directs a selected sampling clock signal of a desired phase from the DLL 130*a* to the ADC 140, in response to a selection signal received by the MUX 134 from the sampling clock signal selector 120*a*.

As known to one having skill in the signal processing arts, a DLL can be used, often in conjunction with a phase-lock loop (PLL), to support clock signal needs via clock signal synthesis, clock signal multiplication, clock signal skew control, and so on. The DLL 135 can provide sampling clock signals of different frequencies by, for example, providing a variable delay of a signal received by the DLL 135 from a PLL. Thus, the sampling clock signal generator 130*a* can include one or more PLLs to, for example, synthesize and/or align frequencies.

The sampling clock-signal selector 120*a*, in response to the data-location signal, selects a sampling clock signal by providing control signals to the sampling clock-signal generator 130*a*. The sampling clock-signal selector 120*a* implements a feedback loop that adjusts selection of sampling clock signals produced by the generator 130*a* in response to comparisons between sampling clock signals and the data-location signal.

The signal comparator 121 performs the comparison of sampling clock signals to the data-location signal. The sampling clock signals are received from the DLL 135 via the dummy MUX 124. The dummy MUX 124, in turn, receives a selection signal from the counter 122.

The signal comparator 121 can be, for example, a differential phase comparator. As known to one having ordinary skill in the signal processing arts, a differential phase comparator can be implemented as a logic circuit to provide a control signal in response to a detected phase difference of compared signals. For example, the comparator 121 can provide an output signal that is positive when the phase difference of the compared signals is positive, and the output signal can be negative when the phase difference of the compared signals is negative. The phase information is thus used to generate a comparator control signal that is supplied to the counter 122. The counter 122, in turn, controls the signal phase selection of the MUXs 134, 124.

The counter 122 can be, for example, an up-down counter that counts up or down depending on a binary level applied at its up-down control terminal, as known to one having ordinary skill in the signal processing arts. In response to an up-down control signal provided in turn by the counter 122 to the dummy MUX 124, the dummy MUX participates in a feedback loop by responsively providing a sampling signal to the comparator 121. The counter 122 will continue to adjust the count in response to phase differentials detected by the comparator 121, until the dummy MUX 124 selects a phase-matched signal.

The selection of a sampling clock signal by the feedback loop can be quick. For example, the feedback loop can settle on a match after approximately 32 or fewer clock cycles. Once the feedback look has selected a counter 122 setting, the control signal from the counter 122 also causes the MUX 134 of the sampling clock-signal generator 130*a* to select an appropriate sampling clock signal for provision from the DLL 135 to the ADC.

In practice, the dummy MUX 124 may only be able to provide, from the DLL 135, sampling clock signals that are a small amount ahead or behind of the phase of the data location signal. The selected sampling clock signal could then responsively jump back-and-forth between two phase selections without further control. The sampling clock-signal selector 120*a* can include features to cause selection of a single sampling clock signal. For example, the filter 123 can be configured to fix the selection of the sampling clock signal.

The sampling clock-signal selector 120*a* can also provide an appropriate phase difference between the chosen sampling clock signal phase and the data location signal phase. For example, the filter 123 can add a preselected phase offset to the control signal provided by the counter 122 when the apparatus 100 is configured so that the comparator 121 selects a sampling clock signal having a phase substantially the same as the transitions of the analog signal. In general, the sampling clock-signal selector 120*a* and the sampling clock-signal generator 130*a* cooperate to deliver to the ADC a sampling clock signal having a phase that causes sampling of the analog signal at temporal locations removed from the transitions of the analog signal.

Figure 7A:
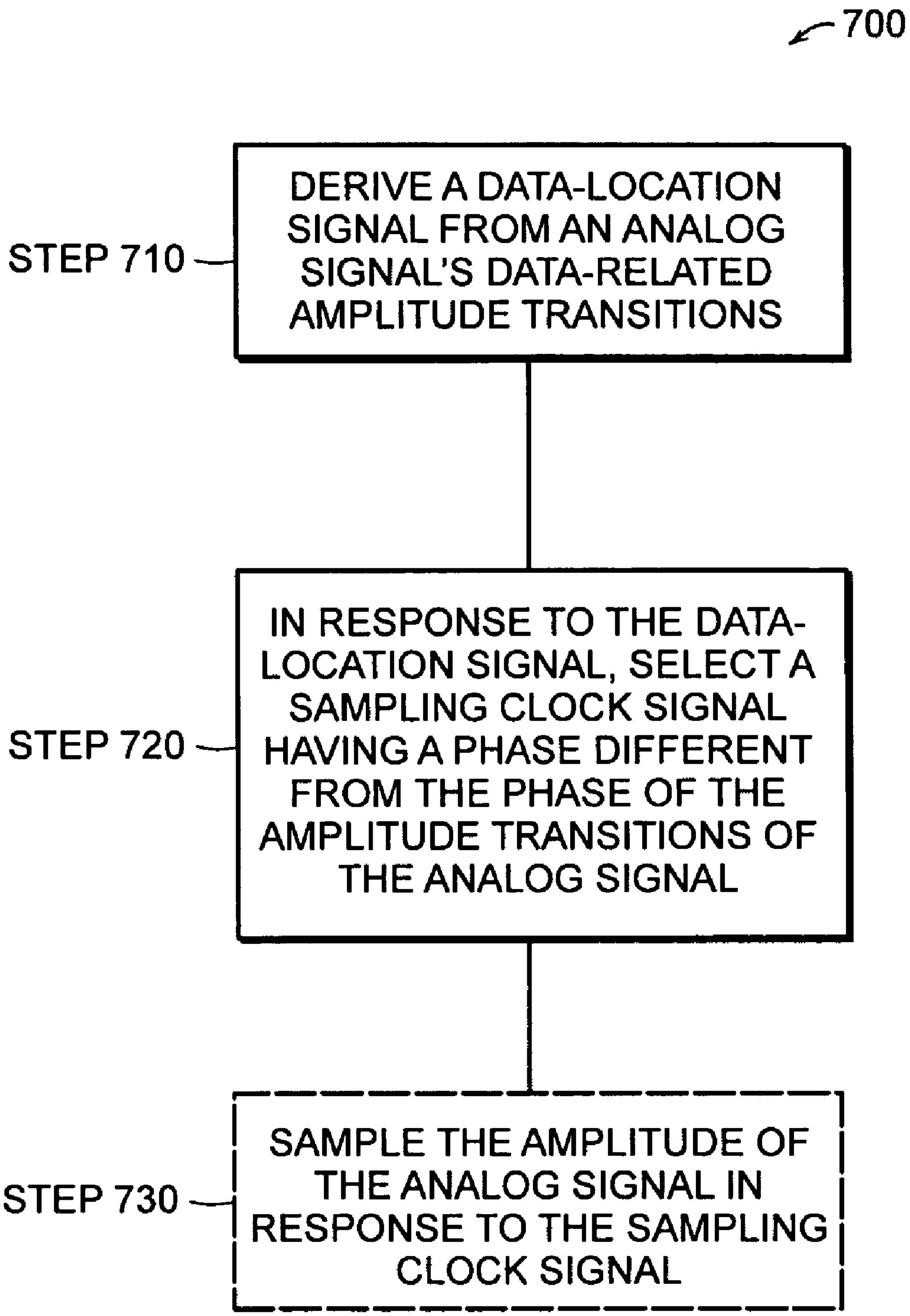
FIG. 7*a* is a flowchart of an embodiment of a method for extracting data from an analog signal, according to principles of the invention.

FIG. 7*a* is a flowchart of a method 700 for extracting data from an analog signal. The method 700 can be used, for example, to extract data from a signal having an amplitude modulated in correspondence with the data. The method can be implemented, for example, with the apparatus 100 described above.

The method 700 includes deriving a data-location signal that identifies a phase of amplitude transitions of the analog signal (Step 710), and selecting, in response to the data-location signal, a sampling clock signal having a phase different from the phase of the amplitude transitions of the analog signal (Step 720). The amplitude transitions of the analog signal are associated with data encoded in the analog signal. The sampling clock signal can be, for example, an encode signal having a frequency and pulse shape as produced by a DLL in a conventional analog-to-digital video processing circuit.

The amplitude transitions of the analog signal identify the location of intervals of the analog signal whose amplitude corresponds to numerical data, as known to one having ordinary skill in the relevant arts. Thus, knowledge of the temporal location of the transitions permits sampling of the amplitude of the analog signal within intervals rather than too near to the transitions. The amplitude transitions of the data-location signal can be, for example, pulse edges. The pulse edges, in turn, identify a phase of the amplitude transitions of the analog signal.

The data-location signal can have the same phase, or substantially the same phase, as the transitions of the analog signal. Alternatively, the data-location signal can have a known phase offset relative to the analog signal. The sampling clock signal can then be selected to have, for example, a phase offset relative to the data-location signal to support effective sampling of the analog signal.

The data-location signal can be derived (Step 710) in part by generating a chain of pulses associated with the amplitude transitions of the analog signal. The chain of pulses can be generated by, for example, the data-location signal generator 110 described above. The pulses can have rising edges associated with the amplitude transitions of the analog signal.

The data-location signal can further be derived (Step 710) in part by filtering the analog signal to remove a DC component from the analog signal. The filtered signal can then exhibit an amplitude spike as derived from each amplitude transition of the analog signal. The filtered signal can be compared to a reference signal to help assure that amplitude spikes are produced for true data-related transitions and not, for example, for noise-related transitions. A pulse can then be generated for each amplitude spike of the filtered analog signal that exceeds a threshold level.

The sampling clock signal can be selected (Step 720) from several clock signals that have a common frequency, but have different phases relative to one another. For example, the clock signals can be generated with phases equally distributed across one interval of the amplitude transitions of the analog signal. For example, if the data encoding interval of the analog signal is 32 msec, 32 clock signals can be generated, and spaced from one another by 1 msec.

Figure 7B:
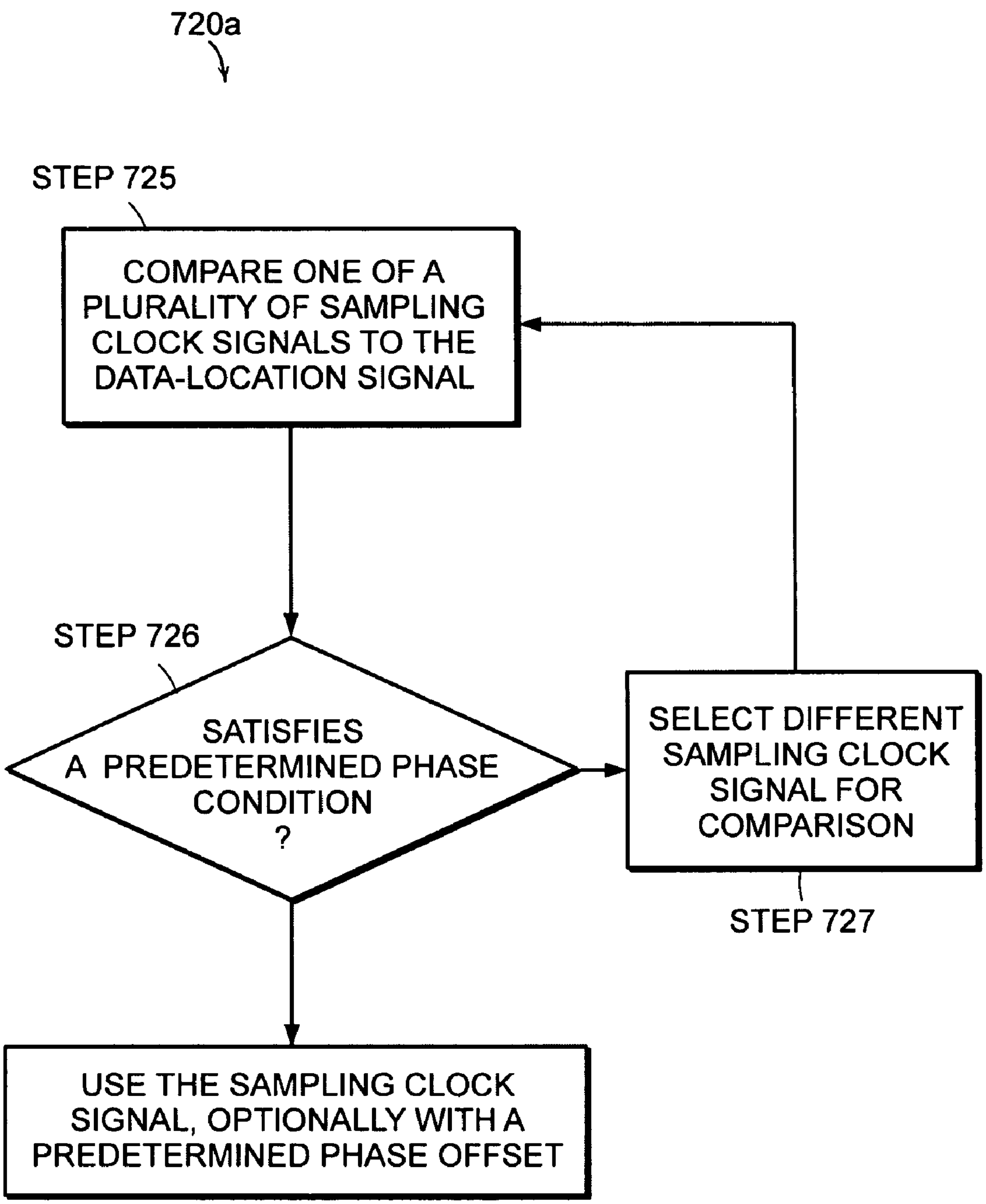
FIG. 7*b* is a flowchart of an embodiment of a method for selecting a sampling clock signal, according to principles of the invention.

FIG. 7*b* is a flowchart of a method 720*a* for selecting a sampling clock signal, according to principles of the invention. The method 720*a* can be used, for example, to select a sampling clock signal (Step 720) in the method 700 described above. One of a plurality of sampling clock signals can be compared to the data-location signal to assist selection of the sampling clock signal (Step 725). The relative phases of the compared signals are tested against a predetermined phase condition (Step 726). If the condition is satisfied, the presently evaluated sampling clock signal can be used for data extraction from the analog signal. If the condition is not satisfied, a different one of the plurality of sampling clock signals can be selected for comparison (Step 727), and a new comparison can proceed (Step 725). Thus, the method 720*a* can be viewed as a feedback process.

The predetermined phase condition can be an in-phase or an out-of-phase condition. For example, if the predetermined condition is an in-phase condition, a an offset can be added to the sampling clock signal to obtain an appropriate clock signal for sampling of the analog signal. If the predetermined condition is an out-of-phase condition, modification of phase with an offset can be optional. The offset can be, for example, a fixed phase offset or a programmable phase offset.

The method 700 can further include sampling the amplitude of the analog signal in response to the sampling clock signal (Step 730). The analog signal can thus be sampled at intervals between the transitions of the analog signal. The analog signal can be sampled by an ADC by supplying the sampling clock signal to an ADC that receives the analog signal.

It will be apparent to one having ordinary skill in the signal processing arts that principles of the invention can be applied to processing of a variety of signal types. The analog signal can be, for example, a video signal. A video signal can be, for example, a monochromatic signal, or a color signal. A color signal can include, for examples, three signals that carry red, green, and blue color level information. The amplitude transitions of the three signals can thus be associated with pixel intensity data identified by portions of the signals between the transitions.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for extracting data from an analog signal having an amplitude modulated in association with the data, the method comprising:

deriving a data-location signal having amplitude transitions corresponding to amplitude transitions of the analog signal, by detecting a rate of change of amplitude of the analog signal and generating an edge if the detected rate of change exceeds a threshold value; and selecting, responsive to the data-location signal, a sampling clock signal having a phase different from a phase of the amplitude transitions of the analog signal.

2. The method of claim 1, wherein deriving the data-location signal comprises generating a chain of pulses associated with the amplitude transitions of the analog signal.

3. The method of claim 2, wherein the pulses have rising edges associated with the amplitude transitions of the analog signal.

4. A method for extracting data from an analog signal having an amplitude modulated in association with the data, the method comprising:

deriving a data-location signal having amplitude transitions that identify a phase of amplitude transitions of the analog signal; and selecting, responsive to the data-location signal, a sampling clock signal having a phase different from the phase of the amplitude transitions of the analog signal;

wherein deriving the data-location signal comprises generating a chain of pulses associated with the amplitude transitions of the analog signal; and wherein deriving the data-location signal further comprises filtering a DC component from the analog signal, and generating the chain of pulses comprises generating a pulse for each amplitude spike of the filtered analog signal that exceeds a threshold level.

5. The method of claim 1, wherein selecting the sampling clock signal comprises selecting one of a plurality of sampling clock signals that is out-of-phase with the data-location signal.

6. The method of claim 5, further comprising generating the plurality of sampling clock signals by providing a plurality of clock signals having a plurality of phases distributed across one interval of the amplitude transitions of the analog signal.

7. The method of claim 5, wherein selecting the sampling clock signal comprises comparing at least one of the plurality of sampling clock signals with the data-location signal to select one of the plurality of sampling clock signals that satisfies a predetermined phase condition.

8. The method of claim 1, wherein selecting the sampling clock signal comprises offsetting the sampling clock signal relative to the data-location signal by a phase amount that is one of a fixed phase offset and a programmable phase offset.

9. The method of claim 1, further comprising sampling, responsive to the sampling clock signal, the amplitude of the analog signal at intervals between the transitions of the analog signal.

10. The method of claim 9, wherein sampling comprises supplying the sampling clock signal to an ADC that receives the analog signal.

11. The method of claim 1, wherein the analog signal comprises a video signal.

12. The method of claim 1, wherein the video signal comprises three signals associated with different colors.

13. The method of claim 1, wherein the data comprises pixel intensity data.

14. An apparatus for extracting data from an analog signal having an amplitude modulated in association with the data, the apparatus comprising:

a signal generator that derives from the analog signal a data-location signal having amplitude transitions corresponding to amplitude transitions of the analog signal, by detecting a rate of change of amplitude of the analog signal and generating an edge if the detected rate of change exceeds a threshold value; and a selector that selects, in response to the data-location signal, a sampling clock signal having a phase different from a phase of the amplitude transitions of the analog signal.

15. The apparatus of claim 14, wherein the signal generator comprises a pulse generator that generates a chain of pulses associated with the amplitude transitions of the analog signal.

16. An apparatus for extracting data from an analog signal having an amplitude modulated in association with the data, the apparatus comprising:

a signal generator that derives from the analog signal a data-location signal having amplitude transitions that identify a phase of amplitude transitions of the analog signal; and a selector that selects, in response to the data-location signal, a sampling clock signal having a phase different from the phase of the amplitude transitions of the analog signal;

wherein the signal generator comprises a pulse generator that generates a chain of pulses associated with the amplitude transitions of the analog signal; and wherein the signal generator further comprises a filter that filters a DC component from the analog signal, and the pulse generator generates a pulse for each amplitude spike of the filtered analog signal that exceeds a threshold level.

17. The apparatus of claim 14, further comprising a sampling clock signal generator that generates a plurality of sampling clock signals distributed in phase, and having a frequency substantially the same as a frequency of the amplitude transitions of the analog signal.

18. The apparatus of claim 14, wherein the selector comprises a signal comparator that compares signals of the plurality of sampling clock signals with the data-location signal.

19. The method of claim 1, wherein the edge is generated at substantially a same time as when the detected rate of change exceeds the threshold value.

20. The method of claim 19, wherein the threshold value is a first threshold value, and wherein deriving the data-location signal further comprises detecting an amplitude change from a first amplitude of the analog signal to a second amplitude of the analog signal, and wherein the edge is generated if both the detected rate of change of amplitude of the analog signal exceeds the first threshold value and the detected amplitude change exceeds a second threshold value.

21. The apparatus of claim 14, wherein the signal generator generates the edge at substantially a same time as when the detected rate of change exceeds the threshold value.

22. The apparatus of claim 21, wherein the threshold is a first threshold, and wherein the signal generator detects an amplitude change from a first amplitude of the analog signal to a second amplitude of the analog signal, and wherein the signal generator generates the edge if both the detected rate of change of amplitude of the analog signal exceeds the first threshold and the detected amplitude change exceeds a second threshold value.

23. The apparatus of claim 15, wherein the pulse generator generates a chain of pulses having rising edges associated with the amplitude transitions of the analog signal.

* * * * *